(12) United States Patent
Kimmel (10) Patent No.: US 8,793,449 B1
(45) Date of Patent: Jul. 29, 2014

(54) STORAGE SUBSYSTEM INCLUDING LOGIC FOR COPY-OUT AND WRITE

(75) Inventor: Jeffrey S. Kimmel, Chapel Hill, NC (US)

(73) Assignee: NetApp, Inc., Sunnyvale, CA (US)

( * ) Notice: Subject to any disclaimer, the term of this patent is extended or adjusted under 35 U.S.C. 154(b) by 946 days.

(21) Appl. No.: 12/905,494

(22) Filed: Oct. 15, 2010

Related U.S. Application Data (60) Provisional application No. 61/252,573, filed on Oct. 16, 2009, provisional application No. 61/330,247, filed on Apr. 30, 2010.

(51) Int. Cl.
*G06F 12/00* (2006.01)

(52) U.S. Cl.
USPC .............................. 711/162; 711/114; 714/2

(58) Field of Classification Search
USPC ....................................... 711/162, 114; 714/2
See application file for complete search history.

(56) References Cited

U.S. PATENT DOCUMENTS

| | | | | | |
|---|---|---|---|---|---|
| 5,307,461 | A | * | 4/1994 | Kiriu | 711/122 |
| 5,471,582 | A | * | 11/1995 | Kiriu | 711/136 |
| 8,495,298 | B2 | * | 7/2013 | Jiang et al. | 711/115 |
| 2011/0264884 | A1 | * | 10/2011 | Kim | 711/170 |

* cited by examiner

*Primary Examiner* — Matthew Bradley
(74) *Attorney, Agent, or Firm* — DeLizio Gilliam, PLLC (57) ABSTRACT

A storage server receives a write request from a client system including new data and a location to store the new data. The storage server transmits a copy instruction to a storage subsystem to relocate old data at the location and transmits a write instruction to the storage subsystem to overwrite the old data with the new data. The storage subsystem includes fast stable storage in which the copy instruction and the write instruction are stored. After receiving each instruction, the storage subsystem sends an acknowledgement to the storage server. When both instructions have been acknowledged, the storage server sends an acknowledgement to the client system. The storage subsystem performs the instructions asynchronously from the client system's write request.

20 Claims, 7 Drawing Sheets

STORAGE SUBSYSTEM INCLUDING LOGIC FOR COPY-OUT AND WRITE

RELATED APPLICATIONS

This application claims priority to U.S. Provisional Application No. 61/252,573, filed on Oct. 16, 2009, and also claims priority to U.S. Provisional Application No. 61/330,247, filed on Apr. 30, 2010.

FIELD OF THE INVENTION

This invention relates generally to storage management, and more particularly to reducing write latency.

BACKGROUND

Most storage subsystems implement a write-in-place policy for placement of data associated with write requests that overwrites existing data. The new write data for a logical location in the storage subsystem is placed in the same physical location as the old data for that logical location.

A storage system uses one or more storage subsystems for its logical storage. If the storage system implements space-efficient point-in-time copies (e.g., snapshot images) for its logical storage, the write-in-place policy requires that old data be copied out of its physical location in the storage subsystem for use in snapshot images before the new data is written into the physical location.

Copying the old data out of the physical location before writing the new data into the physical location creates a latency problem. From the perspective of the client requesting that the new data be written, the client must wait for the copy-out operation and the write operation to complete. Since both of these operations involve interacting with a slow stable storage (e.g., a hard disk drive), this latency may be significant.

Storage systems that implement snapshots currently solve the latency problem by placing fast stable storage (e.g., battery-backed NVRAM) in the storage system managing the snapshot organization. Write requests received by the storage system are stored in the fast stable storage and an acknowledgement is sent to the client indicating completion of the write request. The storage system then performs a copy out operation for the snapshot data using read and write commands on the underlying storage subsystem(s). After the copy out operation is complete, the storage server sends the original write request to the appropriate storage subsystem. The storage server waits for the storage subsystem to complete each operation because the storage subsystem lacks fast stable storage to defer the operations and acknowledge them quickly.

Figure 1A:
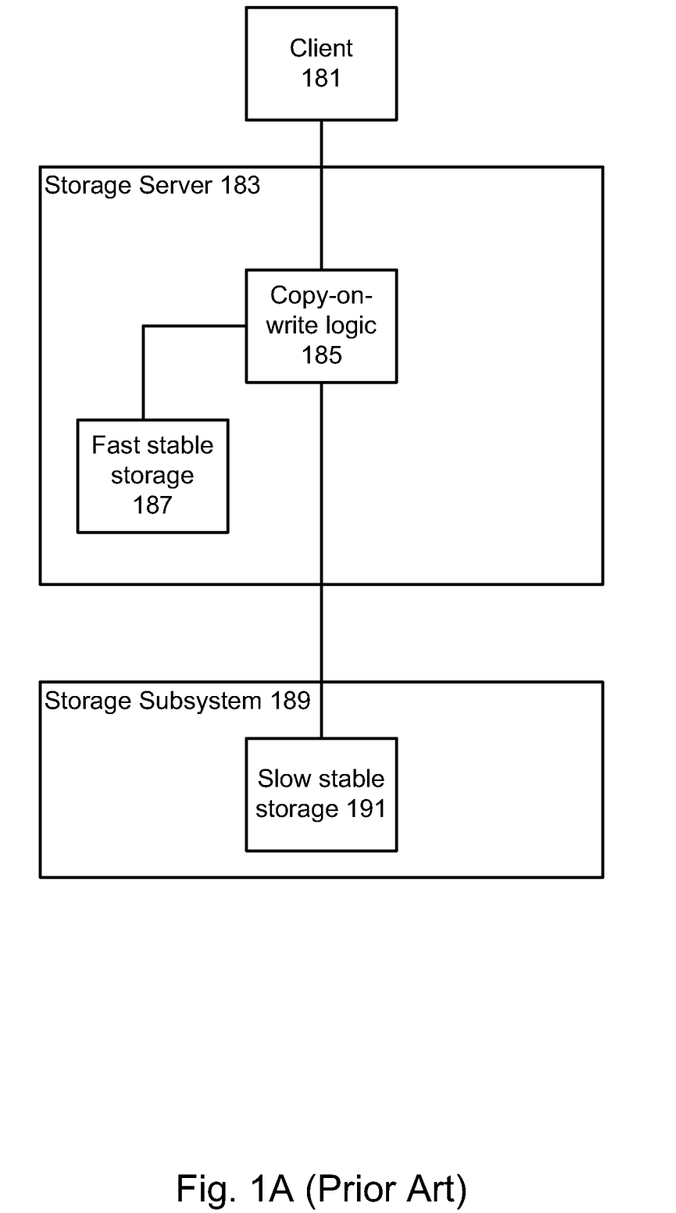
FIG. 1A is a diagram illustrating a prior art storage server and storage subsystem.

FIG. 1A illustrates an existing solution for providing reduced-latency copy-on-write functionality. Client 181 transmits write requests to storage server 183. Copy-on-write logic 185 receives the write request from the client 181 and stores it in fast stable storage 187. Fast stable storage 187 is tightly coupled to the storage server and is generally closely coupled to the other hardware components of the storage server 183. Storage server 183 then sends an acknowledgement to client 181 indicating that the write request is complete, enabling client 181 to continue on to other tasks. Copy-on-write logic 185 performs a copy using read and write instructions to storage subsystem 189 and then waits while storage subsystem 189 performs the read and write instructions on slow stable storage 191. When the read and write instructions are complete, subsystem 189 transmits acknowledgements to storage server 183. Storage server 183 then transmits a write instruction to storage subsystem 189, causing subsystem 189 to write new data received from client 181 to the slow stable storage 189. While the write request is a low-latency operation for the client 181, it requires fast stable storage at the storage server level.

SUMMARY

A storage server receives a write request from a client system including new data and a location to store the new data. The storage server transmits a copy instruction to a storage subsystem to relocate old data at the location and transmits a write instruction to the storage subsystem to overwrite the old data with the new data. The storage subsystem includes fast stable storage in which the copy instruction and the write instruction are stored. After receiving each instruction, the storage subsystem sends an acknowledgement to the storage server. When both instructions have been acknowledged, the storage server sends an acknowledgement to the client system. The storage subsystem subsequently performs the slow read and write instructions to put the data in its final location asynchronously from the client system's write request.

The present invention is described in conjunction with systems, clients, servers, methods, and computer-readable media of varying scope. In addition to the aspects of the present invention described in this summary, further aspects of the invention will become apparent by reference to the drawings and by reading the detailed description that follows.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

In one embodiment, fast stable storage is coupled to a storage subsystem and provides low latency copy and write operations. Fast stable storage may be written to with low latency, but is protected against power failure. One example of fast stable storage is battery-backed non-volatile random access memory (NVRAM). The copy and write operations are received from a storage server coupled to copy-on-write logic. Coupling the fast stable storage to the storage subsystem advantageously allows the cost and complexity of the storage server to be reduced by coupling little or no fast stable storage to the storage server.

Figure 1B:
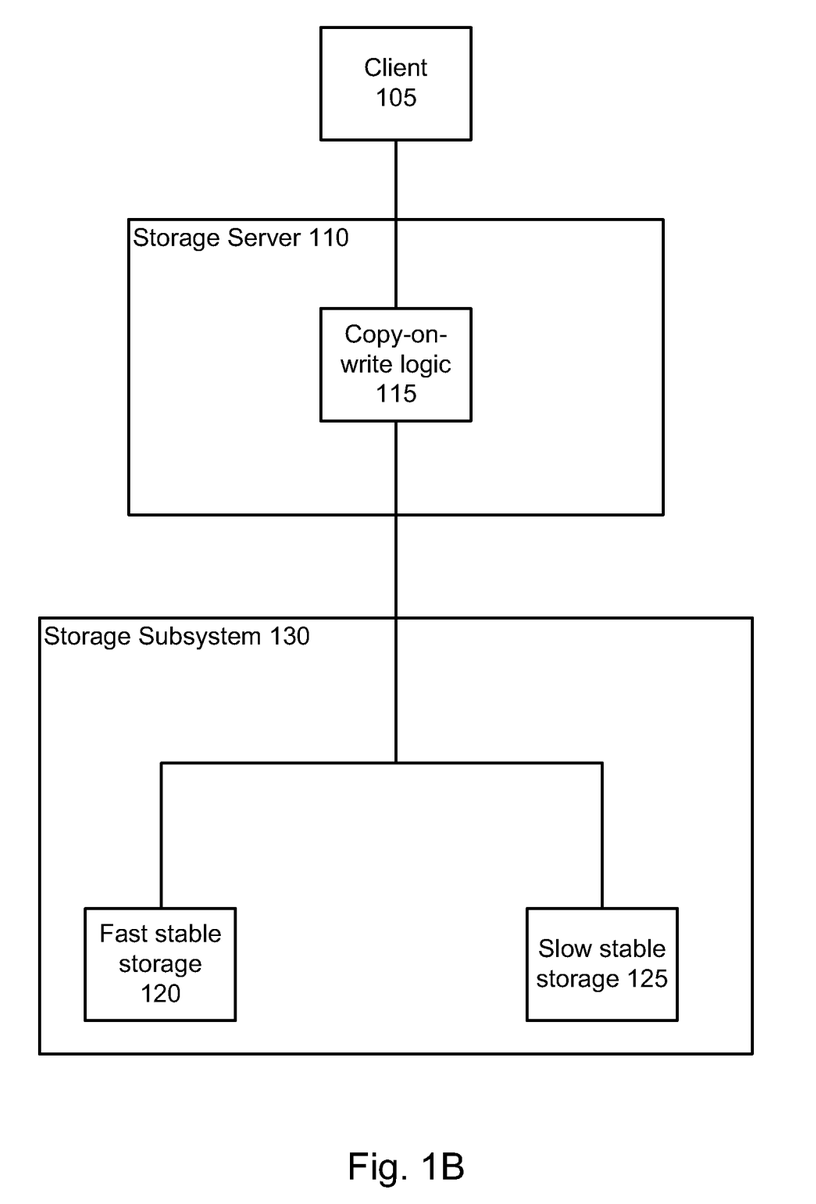
FIG. 1B is a diagram illustrating embodiments of a storage subsystem and a storage server.

FIG. 1B is a diagram illustrating a client 105 coupled to a storage server 110 which is in turn coupled to a storage subsystem 130. The storage server 110 includes copy-on-write logic 115. Storage subsystem 130 includes fast stable storage 120 (e.g., NVRAM) and slow stable storage 125 (e.g., hard disk drive(s)). Client 105 transmits write instructions to storage server 110. The write request may include new data and a physical location on the slow stable storage 125 to write the new data. Alternatively, the write request may refer to a virtual location in a storage space managed by the storage server 110, which the storage server 110 maps into a physical location on slow stable storage 125.

Storage server 110 receives the write requests from the client 105 and passes the write requests to copy-on-write logic 115, which in turn determines that the data currently at the location indicated by the write request needs to be copied to another location before being overwritten by the new data. For example, the old data may be part of a persistent point-in-time image. Copy-on-write logic 115 transmits a copy instruction to storage subsystem 130 indicating to copy the old data from the current location to another location. Storage subsystem 130 stores the copy instruction in fast stable storage 120 and sends an acknowledgement indicating that the copy instruction has been performed to storage server 110. Storing the copy instruction in fast stable storage 120 may be referred to as "queuing" or "deferring" the instruction. Copy-on-write logic 115 then transmits a write instruction to storage subsystem 130 indicating to write the new data into the location specified by the write request. Storage subsystem 130 stores the write request in fast stable storage 120 and sends an acknowledgement to the storage server 110 indicating that the write instruction is complete.

Storage server 130, having received acknowledgements of both the copy instruction and the write instruction, transmits an acknowledgement to the client indicating that the write request is satisfied. The transmission, processing, and storing delays are relatively small compared to the time required to perform the instructions on slow stable storage 125, resulting in relatively low latency from the client. Generally, storage subsystem 130 processes the copy instructions and write instructions asynchronously from when the client 105 receives the acknowledgement.

People of skill in the art will recognize that the individual operations of copying and writing are both idempotent operations: regardless of how many times a copy or write operation is performed, the resulting state is the same. For example, copying data from an old location to a new location leaves both locations in the same state regardless of the number of times the copy is performed. As another example, writing data to a location leaves the location in the same state whether the write is performed once or a hundred times.

A non-idempotent operation produces different results after repeated applications. For example, a combined copy out and write operation is not naturally idempotent. Initially, the value of the old location will be the old data. After the first combined operation, the value of the old location will be the new data (the write operation) and the value of the new location will be the old data (the copy operation). After the combined operation is performed again, the value of the old location and the new location will be the new data, and the old data will have been lost. For this reason, an additional transactional safeguard can be implemented to robustly implement the combined operation, many of which are known in the art. For example, a log may be used to record which operations are to be performed and in what order. In this way, if the storage subsystem 130 recovers from a fault, the log provides the proper ordering of execution: first the copy instruction, second the write instruction.

Figure 1C:
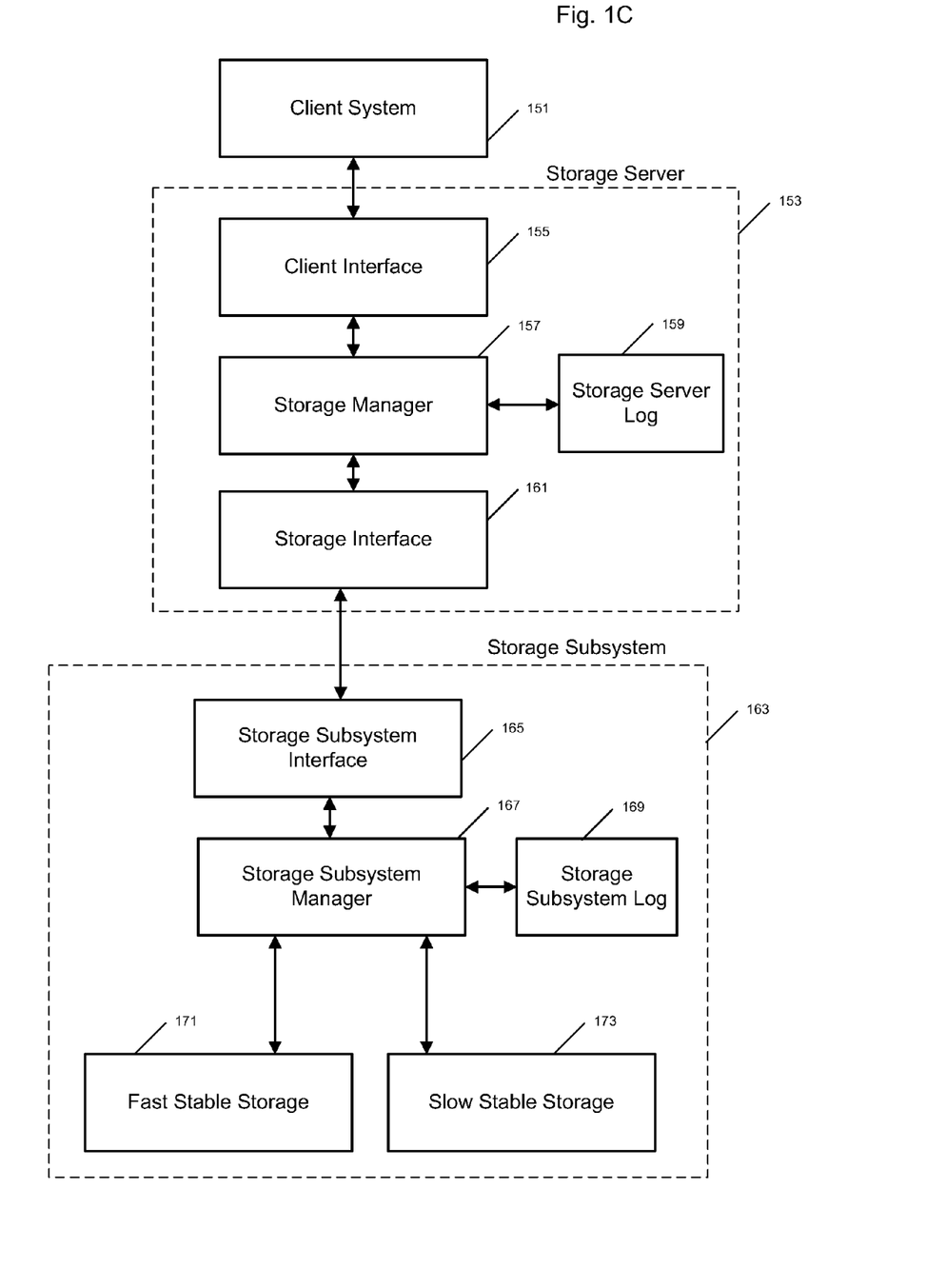
FIG. 1C is a diagram illustrating more detailed embodiments of a storage subsystem and a storage server.

FIG. 1C is a diagram illustrating a more detailed embodiment of a storage server and a storage subsystem. Client system 151 is coupled to storage server 153, which is in turn coupled to storage subsystem 163. Client system 151 may be coupled to storage server 153 over a network. Storage server 153 may be coupled to storage subsystem 163 over a storage network.

Storage server 153 comprises a client interface 155 through which client system 151 communicates with the storage server 153, for example, by transmitting write requests to the storage server. Client interface 155 is coupled to storage manager 157, which includes copy-on-write logic (not shown) for preserving data at a write location specified by a write request received by the client. Storage manager 157 interacts with storage server log 159 in order to provide fault recovery support. In one embodiment, storage server log 159 is stored in storage subsystem 163. In this embodiment, storage server 153 may not include internal storage. In another embodiment, storage server log(s) allows aggregation of multiple subsystems to make up the storage resources used by the storage server. Storage manager 157 is also coupled to storage interface 161 which communicates with storage subsystem interface 165 of storage subsystem 163. For example, storage manager 157 transmits copy instructions and write instructions to storage subsystem 163 through storage interface 161. The storage server log may be implemented as a software or hardware module. In the embodiment illustrated in FIG. 1C, the storage server log is a software module implemented using resources of an underlying storage subsystem such as storage subsystem 163.

Storage subsystem 163 comprises storage subsystem interface 165 for communicating with storage server 153. Subsystem 163 also includes a storage subsystem manager 167 configured to queue or defer instructions in fast stable storage 171, allowing storage subsystem 163 to provide low latency response to copy instructions and write instructions from storage server 153. Storage subsystem manager 167 is also coupled to slow stable storage 173, such as a hard disk drive, redundant array of independent disks (RAID), flash memory device, or other types of storage. Storage subsystem manager 167 modifies slow stable storage 173 asynchronously from storage server 153 and client 151 by performing instructions queued or deferred in fast stable storage 171. Storage subsystem manager 167 also logs received instructions to storage subsystem log 169 for fault recovery purposes.

Figure 2:
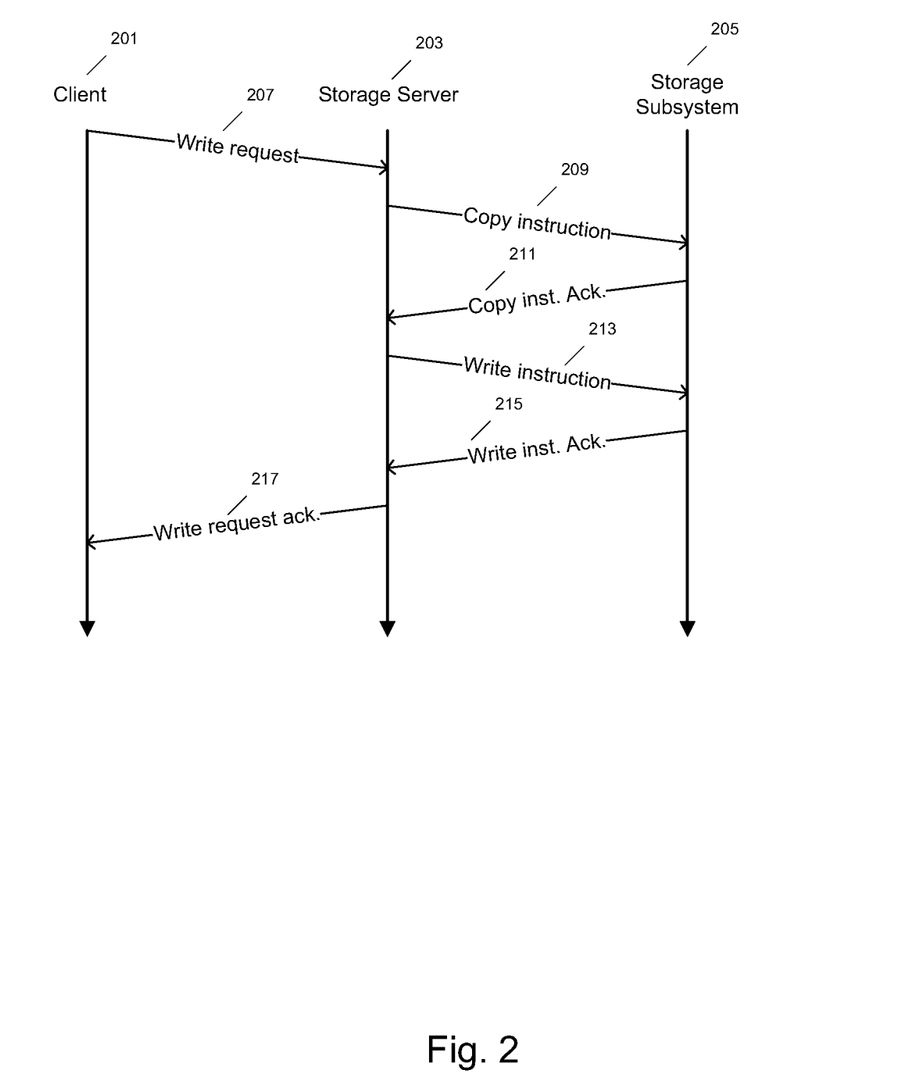
FIG. 2 is a timing diagram illustrating an embodiment of a storage server interacting with an embodiment of a storage subsystem and a client system.
Figure 3:
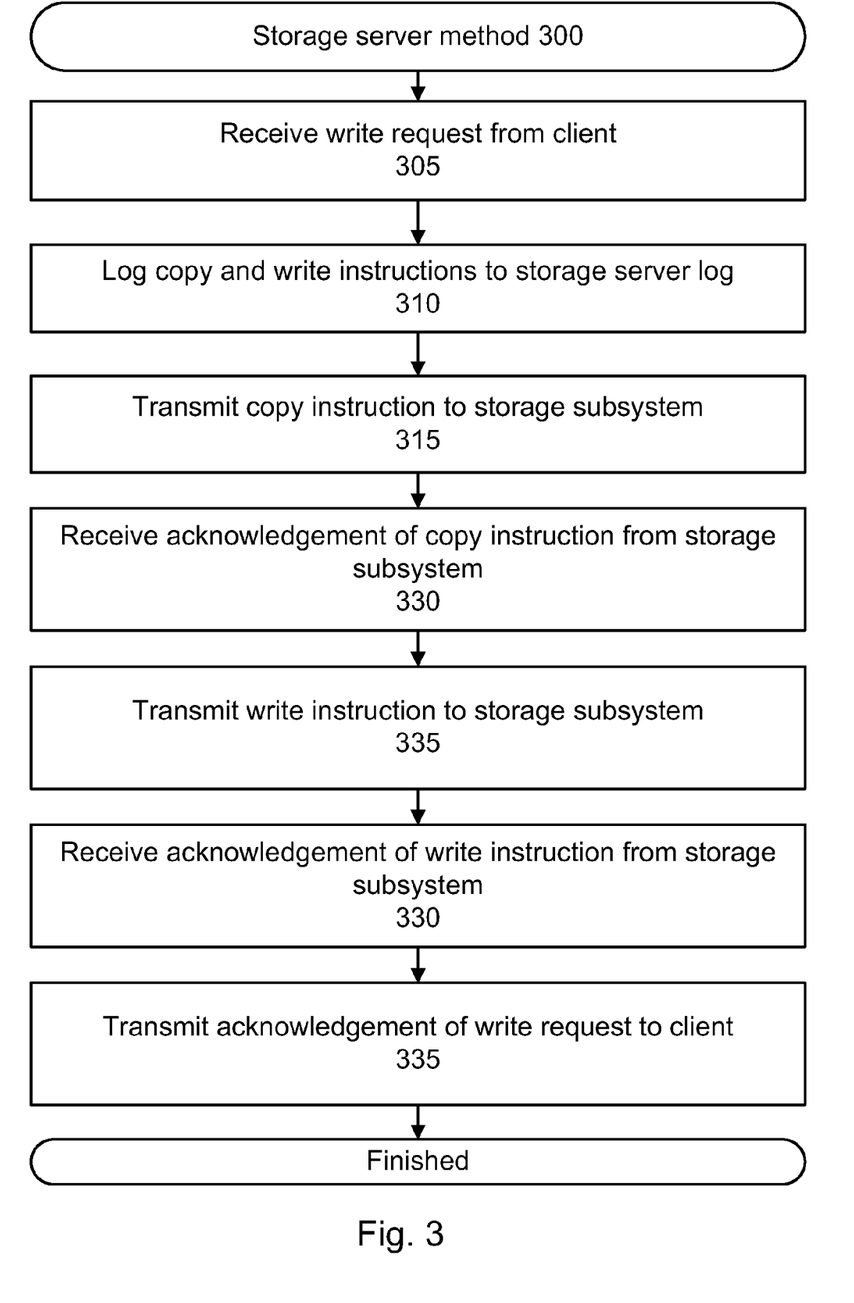
FIG. 3 is a flow diagram illustrating an embodiment of storage server method.
Figure 4:
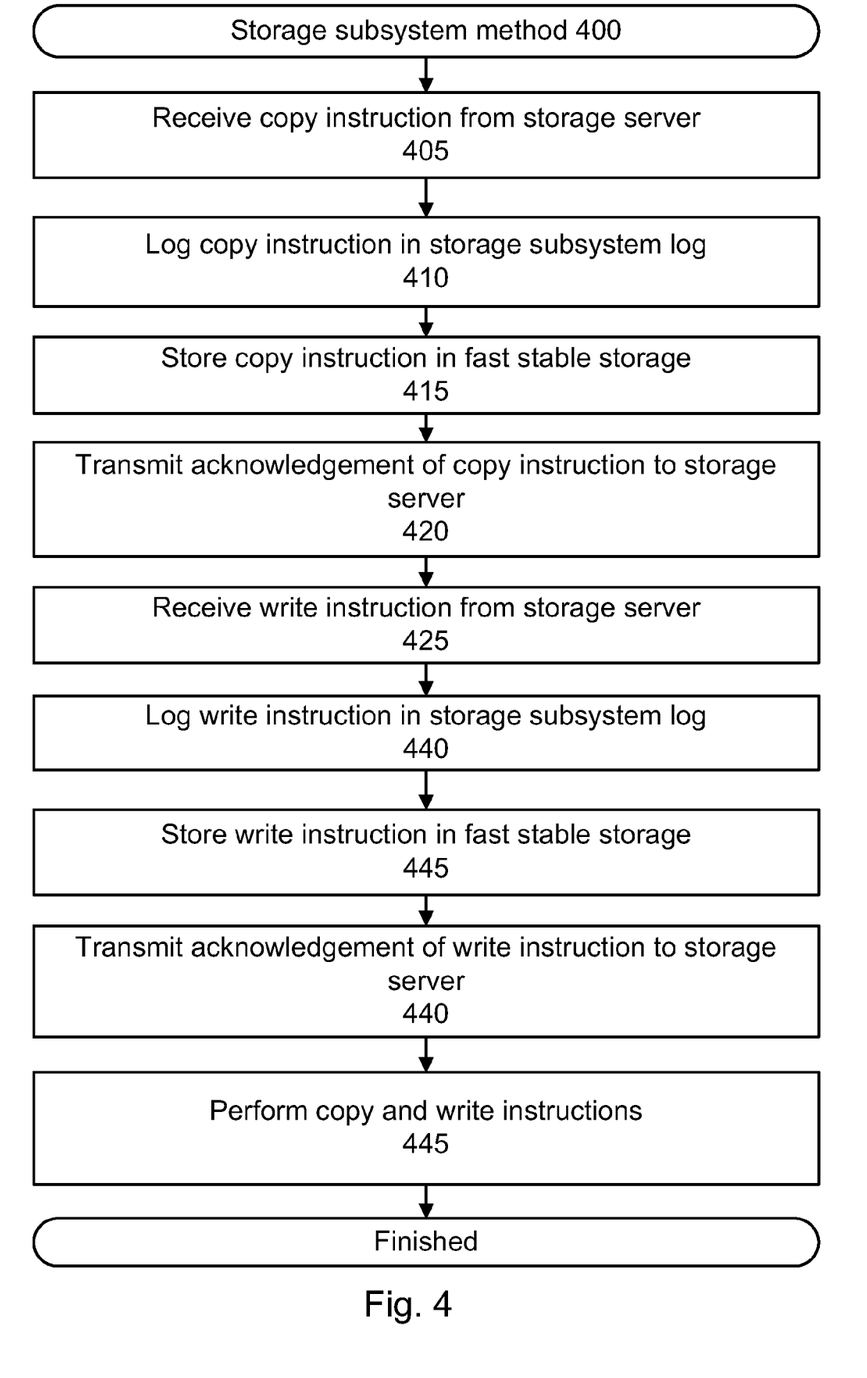
FIG. 4 is a flow diagram illustrating an embodiment of a storage subsystem method.

FIG. 2 is a timing diagram which illustrates interactions between a client system 201, a storage server 203, and a storage subsystem 205 over time. FIGS. 3 and 4 are flow charts illustrating embodiments of methods that may be performed by the storage server and storage subsystem, respectively, to carry out interactions illustrated in FIG. 2. The diagram begins with a write request 207 transmitted from the client 201 to the storage server 203. The write request generally includes new data to be written and a location in a storage space at which to write the new data. The location may be a physical location on a storage medium, such as a hard disk drive. It may refer to a storage location in a redundant array of independent disks. It may also refer to a virtual or logical location in a storage object such as a volume which may include several physical storage devices.

In response to receiving the write request 207, storage server 203 transmits a copy instruction 209 to storage subsystem 205. The copy instruction instructs the storage subsystem 205 to copy old data in the location identified by the write request to a new location. The new location may be another location in a RAID or disk, or may be a temporary location in a RAID, disk, or fast stable storage, such as NVRAM. Storage subsystem 205 defers the copy instruction after it receives it and sends an acknowledgement 211 to the storage subsystem indicating that the copy instruction is complete. Generally, the copy instruction is queued in fast stable storage for subsequent processing and an entry is stored in a log allowing the storage subsystem to restore its state in the event of a fault. Since the copy instruction is protected from faults, the storage server 203 can move on to other tasks, even though the copy instruction may not be processed with respect to the final destination of the copied data. In one embodiment, a deferred copy operation appears complete to subsequent operations. For example, if a subsequent read operation specifies a location that will be overwritten by the deferred copy operation when it is complete, the read operation will obtain the correct data from the deferred copy operation.

After receiving acknowledgement 211, storage server 203 transmits a write instruction 213 to storage subsystem 205. The write instruction 213 includes the new data to be written and the location to write the new data. Storage subsystem 205 stores the write instruction in fast stable storage and sends acknowledgement 215 to storage server 203. Fault protection for the write instruction is provided by the storage subsystem in a similar manner as described above with respect to the copy instruction. After storage subsystem 205 stores the write instruction, storage subsystem 205 transmits an acknowledgement 215 to storage server 203. After receiving acknowledgement 215, storage server transmits an acknowledgement 217 of the write request to client system 201. Client system 201 moves on to other tasks after receiving the acknowledgement 217, while storage subsystem 205 asynchronously processes the queued copy instruction and write instruction.

FIG. 3 is a flow diagram illustrating an embodiment of a storage server method 300 for handling a write request received by the storage server from a client system. The method 300 may be performed by storage server 153 in FIG. 1C. At block 305, the method receives a write request from a client system. The write request may request that the storage server write data included in the request to a location included in the request. Alternatively, the write request may indicate a virtual location in a virtual storage space managed by the storage server, in which case the storage server would map the virtual location into a physical location using techniques known in the art.

At block 310, the method logs a copy instruction and a write instruction to a storage server log. Alternatively, the method may write the write request to a log. The storage server log is used to provide fault recovery by providing a history of requests and other operations undertaken by the storage server which may not be complete when the fault occurs. Fault recovery techniques are well known in the art. The history of requests may be obtained from the storage server log.

At block 315, the method transmits the copy instruction to the storage subsystem. The copy instruction indicates to copy data from the location in the write request to another location to preserve the data currently in the location indicated by the write request.

At block 320, the method receives an acknowledgement indicating completion of the copy instruction from the storage subsystem. The copy instruction may be queued in fast stable storage as described below in conjunction with FIG. 4.

At block 325, the method transmits the write instruction to the storage subsystem. Generally, the write instruction is not transmitted until the copy instruction has been acknowledged by the storage subsystem. This accommodates the non-idempotent nature of a copy instruction followed by a write instruction. The write instruction includes the data from the write request and the location from the write request. The storage server may include logic for determining whether the location in the write request refers to a location which requires a copy instruction to preserve the old data. The logic may look up the location in filesystem metadata to determine whether the location requires copy-on-write processing.

At block 330, the method receives an acknowledgement indicating completion of the write instruction from the storage subsystem. As in the case of the copy instruction, the write instruction may be queued in stable storage and not yet performed on slow storage.

At block 335, after receiving the acknowledgement of the write instruction, the method transmits an acknowledgement to the client system indicating that the write request has been satisfied and allowing the client to move on to other tasks.

FIG. 4 is a flow chart illustrating an embodiment of a storage subsystem method 400 for handling copy and write instructions from a storage server. The method 400 complements storage server method 300 of FIG. 3 and may be performed by storage subsystem 163 of FIG. 1C. At block 405, the method receives a copy instruction from a storage server. The copy instruction indicates to copy data from a location specified in the copy instruction to a different location which may also be specified in the copy instruction. The copy instruction may indicate to copy the data from the specified location to a temporary location in fast stable storage, a temporary location in slow stable storage, or a permanent location in slow stable storage. The copy instruction may be intended to preserve data at the specified location before it is overwritten by a subsequent write instruction.

At block 410, the method creates an entry in the storage subsystem log indicating receipt of the copy instruction. The log entries enable the storage subsystem to recover from a fault occurring while processing the instruction.

At block 415, the method stores the copy instruction in the fast stable storage. The copy instruction may be stored in a queue or other data structure. The copy instruction may be considered "deferred" in that it is fault-recoverable due to the log and stable nature of the fast stable storage, but is not yet performed in that it has not copied the specified data from the current location on the slow stable storage to another location.

At block 420, the method transmits an acknowledgement indicating completion of the copy instruction to the storage server. This allows the storage server to move on to subsequent tasks. The copy instruction may not yet be performed, but is reliably stored in the fast stable storage and the correct order of execution is known from the storage subsystem log, so the storage server may be informed that the copy instruction is complete.

At block 425, the method receives a write instruction from the storage server. The write instruction includes a location on the slow stable storage and new data to be written to that location. Generally, the location is shared with the previous copy instruction.

At block 430, the method creates a log entry in the storage subsystem log corresponding to the write instruction. The log provides the necessary context for recovering from a fault in the storage subsystem. At block 435, the method stores the write instruction in fast stable storage, deferring processing until later. At block 440, the method transmits an acknowledgement indicating completion of the write instruction to the storage server. This allows the storage server to acknowledge a write request from a client system as complete. At block 445, the method performs the deferred copy and write instructions. This may occur asynchronously from processing of the client system, in that the client system returns from the write request to the storage server assuming that the write request has been satisfied.

Multiple copy and write instructions may be deferred in the storage subsystem if write requests are received by the storage server before the storage subsystem processes previously deferred instructions. If the storage subsystem receives a read instruction specifying a location to be modified by a deferred instruction, the storage subsystem processes the deferred instructions on the fly to provide the correct result for the read instruction. For example, if a deferred write instruction comprising new data A and referring to a location on slow stable storage that comprises old data B and a read instruction is received specifying that location, the storage subsystem will evaluate the deferred instructions in order to correctly return the new data A rather than the old data B.

Figure 5:
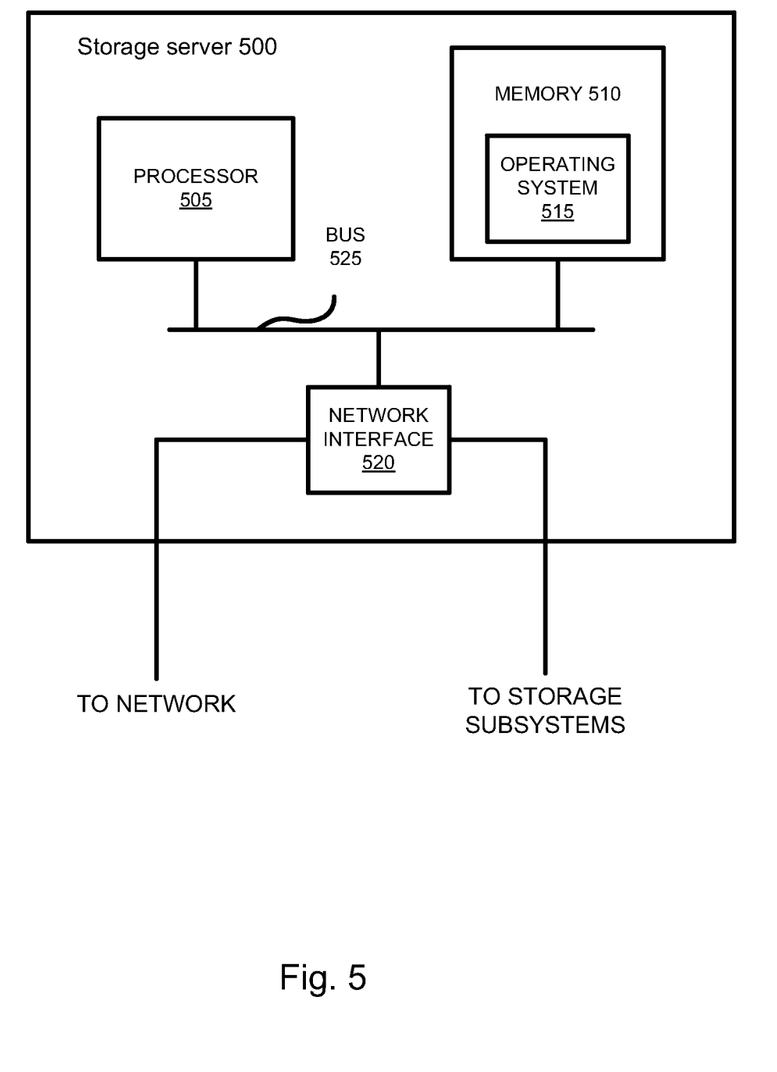
FIG. 5 is a diagram illustrating a system-level overview of a storage server.

Storage server 153 may be implemented as illustrated in FIG. 5, in which the storage server 500 includes a processor 505, a memory 510, and a network interface 520, which are coupled to each other via a bus system 525. Reference is made back to elements of FIG. 1C in the context of the description of FIG. 5. The bus system 525 may include one or more buses and/or interconnects. The storage server 500 communicates with a network (e.g., the Internet) via the network interface 520, which can be an Ethernet adaptor, fiber channel adaptor, etc. The network interface 520 may be coupled to a public network, a private network, or a combination of both in order to communicate with a client machine usable by an administrator of the data storage system. Client interface 155 may use network interface 520 to communicate with the network, while storage interface 161 may use network interface 520 to communicate with storage subsystems. Storage server log 159 may be stored in memory 510 along with executable instructions corresponding to storage manager 157 which may be executed by processor 505.

In one embodiment, the processor 505 reads instructions from the memory 510 and executes the instructions. The memory 510 may include any of various types of memory devices, such as, for example, random access memory (RAM), read-only memory (ROM), flash memory, one or more mass storage devices (e.g., disks), etc. The memory 510 stores instructions of an operating system 515. The processor 505 may retrieve the instructions from the memory 510 to run the operating system 515. The storage serve 500 interfaces with one or more storage subsystems. In other embodiments, the storage server 500 may interface with storage servers via a storage adaptor (not shown), which may include a small computer system interface (SCSI) adaptor, fiber channel adaptor, etc. In one embodiment, memory 510 may be a flash-based solid-state device (SSD), sometimes known as a flash drive.

Although illustrated as a self-contained element, the storage server 500 may have a distributed architecture; for example, it may include a separate N-("network") blade and D-(disk) blade (not shown). In such an embodiment, the N-blade is used to communicate with clients, while the D-blade includes the file system functionality and is used to communicate with the storage subsystems. The N-blade and D-blade communicate with each other using an internal protocol. Alternatively, the storage server 500 may have an integrated architecture, where the network and data components are all contained in a single box. The storage server 500 further may be coupled through a switching fabric to other similar storage servers (not shown) which have their own local storage subsystems. In this way, all of the storage subsystems can form a single storage pool, to which any client of any of the storage servers has access.

Note that any or all of the components of system 500 and associated hardware may be used in various embodiments of the present invention. However, it can be appreciated that other configurations of the data storage system may include some or all of the devices disclosed above.

In one embodiment, the storage server 500 includes a storage area network (SAN) to transmit read/write requests at the block level of the storage subsystems. A block is the basic unit of data used to store data in the SAN. In an alternate embodiment, the storage server 500 is a network-attached storage (NAS) system that transmits data at the file level. In the NAS system, complete files are retrieved instead of blocks on a disk. The NAS system uses file access protocols to retrieve data, such as, for example, Network File System (NFS), or Common Internet File System (CIFS). The SAN and the NAS systems may be implemented in a single server or in separate servers.

A storage subsystem such as storage subsystem 163 may be implemented with components similar to those illustrated in FIG. 5. Some embodiments of the invention may include multiple underlying subsystems. For example, subsystems may be bested in cases where the subsystems have no fast stable storage other than from underlying subsystems. Subsystems may be shared among multiple storage servers and may take the form of hard disk drives, solid state devices, storage controllers, I/O layers or virtual machines within a hypervisor or host operating system. Some subsystems may use fast copy onw rite to address other read-then-write cases, such as parity RAID writes.

Other subsystems may include some stable storage addresses explicitly bound to fast storage locations, while other subsystems may use fast storage only to cache slow storage locations. Some storage servers may reside on separate storage controllers, while other storage servers may run on application servers, for example, within a virtual machine. Some storage servers may be file systems or other I/O subsystems within a hypervisor or host operating system.

In one embodiment, deferred write allocation to a final location within the storage subsystem may be enabled by writing the new write data to a fast storage location in a storage subsystem and then copying or moving the new write data to a final location. Copy and write and/or log write instructions may be combined into a compound instruction which may or may not have atomic properties.

In practice, the methods 300 and 400 illustrated in FIGS. 3 and 4 may constitute one or more programs made up of computer-executable instructions. Describing the method with reference to the flowcharts in FIGS. 3 and 4 enables one skilled in the art to develop such programs, including such instructions to carry out the operations (acts) represented by logical blocks on suitably configured computers (the processor of the computer executing the instructions from computer-readable storage media). The computer-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be further appreciated that more or fewer processes may be incorporated into the methods illustrated in FIGS. 3 and 4 without departing from the scope of the invention and that no particular order is implied by the arrangement of blocks shown and described herein.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

Moreover, the description of FIG. 5 is intended to provide an overview of computer hardware and other operating components suitable for performing the methods of the invention described above, but is not intended to limit the applicable environments. One of skill in the art will immediately appreciate that the invention can be practiced with other computer system configurations. The invention can also be practiced in distributed computing environments where tasks are performed by remote processing devices that are linked through a communications network.

It will be readily apparent to one of skill, that input/output devices, such as a keyboard, a pointing device, and a display, may be coupled to the storage subsystem. These conventional features have not been illustrated for sake of clarity.

The term "memory" as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into memory during execution of software by a processor. One of skill in the art will immediately recognize that the term "computer-readable non-transitory storage medium" includes any type of volatile or non-volatile storage device that is accessible by a processor.

Therefore, it is manifestly intended that this invention be limited only by the following claims and equivalents thereof.

What is claimed is:

1. A method performed by a storage server, the method comprising:
   receiving a write request from a client system, the write request comprising data to be written and a location in a storage space;
   transmitting a copy instruction to a storage subsystem, the copy instruction indicating to copy existing data at the location in the storage space to a new location;
   receiving an acknowledgement of the copy instruction from the storage subsystem;
   transmitting, in response to the acknowledgement of the copy instruction, a write instruction to the storage subsystem, the write instruction indicating to write the data to be written to the location in the storage space;
   receiving an acknowledgement of the write instruction from the storage subsystem; and
   transmitting, in response to the acknowledgement of the write instruction, an acknowledgement of the write request to the client system.

2. The method of claim 1, further comprising:
   storing a log entry corresponding to the write request in a storage server log.

3. The method of claim 1, wherein the storage subsystem is a redundant array of independent disks (RAID).

4. A method performed by a storage subsystem comprising a fast stable storage and a slow stable storage, the method comprising:
   receiving a copy instruction from a storage server, the copy instruction indicating to copy data from a current location in the slow stable storage to a new location, wherein the new location is in one of the slow stable storage and the fast stable storage;
   storing the copy instruction in the fast stable storage; and
   transmitting an acknowledgement of the copy instruction to the storage server;
   receiving a write instruction from the storage server, the write instruction comprising data to be written and a location on the slow stable storage;
   storing the write instruction in the fast stable storage; and
   transmitting an acknowledgement of the write instruction to the storage server.

5. The method of claim 4, further comprising:
   generating a log entry corresponding to the copy instruction in a storage subsystem log; and
   generating a log entry corresponding to the write instruction in the storage subsystem log.

6. The method of claim 4, wherein the fast stable storage is non-volatile random access memory (NVRAM).

7. The method of claim 4, wherein the slow stable storage is at least one hard disk drive (HDD).

8. The method of claim 4, further comprising:
   asynchronously performing the copy instruction and the write instruction.

9. A method comprising:
   receiving, by a storage server, a write request from a client system, the write request comprising data to be written and a location in a storage space, wherein the storage space comprises a slow stable storage coupled to a storage subsystem and a fast stable storage coupled to the storage subsystem;
   transmitting, by the storage server, a copy instruction to the storage subsystem, the copy instruction indicating to copy existing data at the location in the storage space to a new location;
   receiving, by the storage subsystem, the copy instruction;
   storing, by the storage subsystem, the copy instruction in the fast stable storage;
   transmitting, by the storage subsystem, an acknowledgement of the copy instruction to the storage server;
   receiving, by the storage server, the acknowledgement of the copy instruction from the storage subsystem;
   transmitting, by the storage server in response to the acknowledgement of the copy instruction, a write instruction to the storage subsystem, the write instruction indicating to write the data to be written to the location in the storage space;
   receiving, by the storage subsystem, the write instruction from the storage server;
   storing, by the storage subsystem, the write instruction in the fast stable storage;
   transmitting, by the storage subsystem, an acknowledgement of the write instruction to the storage server;

receiving, by the storage server, the acknowledgement of the write instruction from the storage subsystem; and transmitting, by the storage server in response to the acknowledgement of the write instruction, an acknowledgement of the write request to the client system.

10. The method of claim 9, further comprising:

asynchronously performing the copy instruction and the write instruction.

11. A system comprising:

a storage server comprising:

a client interface module to receive a write request from a client system;

a storage manager module coupled to the client interface module to generate a copy instruction and a write instruction in response to the write request and to transmit an acknowledgement to the client system, wherein the copy instruction indicates to copy data from an old location to a new location and the write instruction indicates to write new data from the write request to the old location;

a storage interface module coupled to the storage manager module to transmit the copy instruction and the write instruction to the storage server;

and a storage subsystem comprising:

a storage subsystem interface module to receive the copy instruction and the write instruction from the storage interface module;

a storage subsystem manager module to store the copy instruction and the write instruction in fast stable storage and to transmit acknowledgements of the copy instruction and the write instruction to the storage interface module.

12. The system of claim 11, the storage server further comprising:

a storage server log module to generate a log entry corresponding to the write request.

13. The system of claim 11, the storage subsystem further comprising:

a storage subsystem log module to generate log entries corresponding to the copy instruction and the write instruction.

14. The system of claim 11, wherein the storage subsystem manager is further configured to process the copy instruction and the write instruction asynchronously after the client system receives the acknowledgement of the write request from the storage server.

15. A system comprising:

a client interface coupled to a storage server bus;

a storage server processor coupled to the storage server bus;

a storage server instruction memory coupled to the storage server bus;

a storage interface coupled to the storage server bus;

executable instructions stored in the storage server instruction memory which when executed by the storage server processor cause the storage server processor to:

receive a write request from a client system through the client interface, transmit a copy instruction through the storage interface, receive an acknowledgement of the copy instruction through the storage interface, transmit a write instruction through the storage interface, receive an acknowledgement of the write instruction through the storage interface, and transmit an acknowledgement of the write request through the client interface;

a storage subsystem interface coupled to a storage subsystem bus, wherein the storage subsystem interface is coupled to the storage interface through a storage network;

a fast stable storage device coupled to the storage subsystem bus;

a slow stable storage device coupled to the storage subsystem bus;

a storage subsystem processor coupled to the storage subsystem bus;

a storage subsystem instruction memory coupled to the storage subsystem bus; and executable instructions stored in the storage subsystem instruction memory which when executed by the storage subsystem processor cause the storage subsystem processor to:

receive the copy instruction through the storage subsystem interface, store the copy instruction in the fast stable storage device, transmit an acknowledgement of the copy instruction through the storage subsystem interface, receive the write instruction through the storage subsystem interface, store the write instruction in the fast stable storage device, and transmit an acknowledgement of the write instruction through the storage subsystem interface.

16. The system of claim 15, wherein the executable instructions stored in the storage subsystem instruction memory further cause the storage subsystem processor to asynchronously perform the copy instruction and the write instruction after the client system receives the acknowledgement of the write request.

17. The system of claim 16, wherein performing the copy instruction comprises copying data from a location in the slow stable storage device specified in the copy instruction to a new location in one of the fast stable storage device and the slow stable storage device.

18. The system of claim 17, wherein performing the write instruction comprises writing data included in the write instruction to a location in the slow stable storage device specified by the write instruction and wherein the location specified by the write instruction is the same as the location specified in the copy instruction.

19. The system of claim 15, wherein the fast stable storage is a non-volatile random access memory (NVRAM).

20. The system of claim 15, wherein the slow stable storage device is a redundant array of independent disks (RAID).

* * * * *